No. 852,538. PATENTED MAY 7, 1907.
E. E. BILLOW.
BURNER FOR GAS LAMPS.
APPLICATION FILED FEB. 25, 1905.
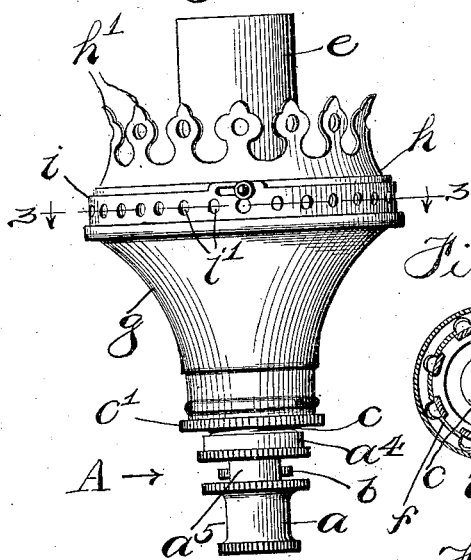
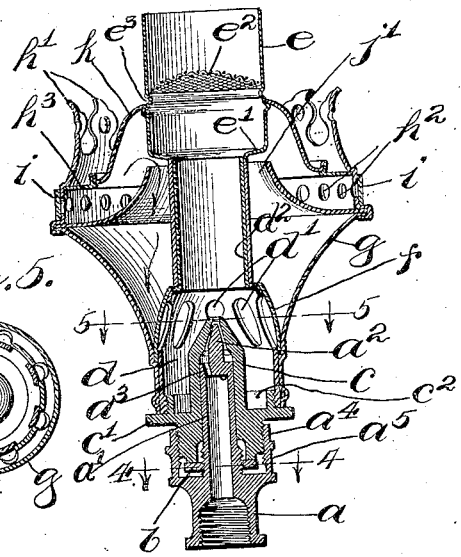
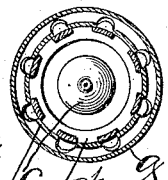
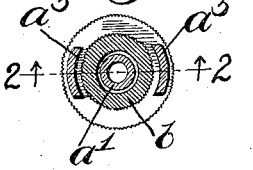
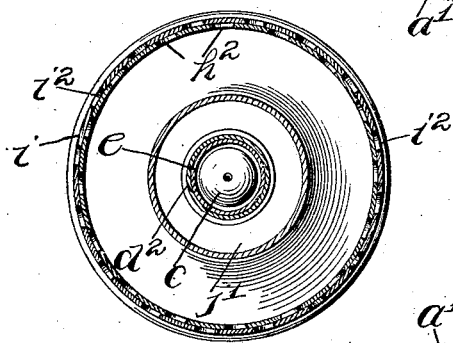
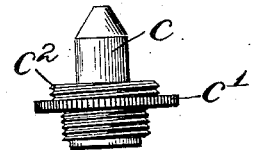
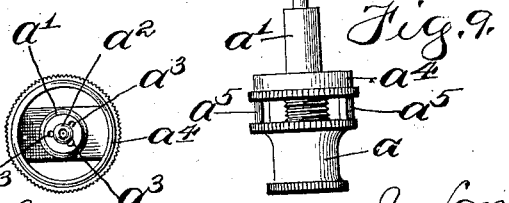
Witnesses:
J. B. Weir
Ba D. Perry
Inventor:
Elmer E. Billow
By Cheever & Cox
Attys

UNITED STATES PATENT OFFICE.

ELMER E. BILLOW, OF CHICAGO, ILLINOIS.

BURNER FOR GAS-LAMPS.

No. 852,538.  Specification of Letters Patent.  Patented May 7, 1907.

Application filed February 25, 1905. Serial No. 247,332.

*To all whom it may concern:*

Be it known that I, ELMER E. BILLOW, a citizen of the United States, residing at Chicago, in the county of Cook and State of Illinois, have invented a certain new and useful Improvement in Burners for Gas-Lamps, of which the following is a specification.

My invention relates to burners for gas lamps, and the objects of the invention are first, to provide means for regulating the flow of gas into the mixing chamber; second, to regulate the flow of air to the mixing chamber; third, to provide means for heating the air before it reaches the mixing chamber; and fourth, to provide certain details of construction hereinafter more fully described and claimed.

I accomplish my objects by the mechanism illustrated in the accompanying drawings in which:

Figure 1 is a general side view of the device. Fig. 2 is a vertical section thereof, taken transverse to the plane of the paper, Fig. 1. The plane of the section is also indicated by the line 2—2 Fig. 4. Figs. 3, 4, and 5 are horizontal sectional views taken respectively on the lines 3—3 Fig. 1 and 4—4 and 5—5 Fig. 2. Fig. 6 is a plan view of the stationary supply nipple including the pin thereon which constitutes the stationary part of the gas valve. Fig. 7 is a side view of the screw cap which constitutes the movable part of the gas valve. Fig. 8 is a side view of the lock nut for holding the screw cap in adjusted position. Fig. 9 is a side view of the supply nipple and the conical pin which is formed thereon and constitutes the stationary parts of the gas valve. The direction of view is indicated by the arrow at A, Fig. 1 and is transverse to line 2—2 Fig. 4. Fig. 10 is a fragmentary vertical sectional view showing a portion of the mixing chamber and adjacent parts.

Similar letters refer to similar parts throughout the several views.

The nipple $a$ is internally threaded to make screw connection with the pipe or other duct through which gas is conveyed from the source of supply, the term "gas" being meant to include any inflammable vapor, for example, illuminating gas or vapor formed by the volatilization of a liquid hydrocarbon. Extending upward from said nipple $a$ and preferably formed integral therewith, is the tubular extension $a^1$ terminating at its upper extremity with the conical pin $a^2$. At the shoulder formed at the junction of the said extension $a^1$ and pin $a^2$ are the apertures $a^3$ for the exit of gas from said extension. The lower portion of said extension is threaded for receiving and supporting the lock nut $b$ which consists preferably of a thin ring or collar interiorly threaded and having a knurled or milled periphery as shown.

An internally threaded ring $a^4$ is supported a slight distance above the nipple $a$ by means of posts $a^5$, as best shown in Figs. 1, 2, 4, and 9, a space being thereby afforded at said nipple through which the fingers of the operator may gain access to said lock nut, for screwing it up and down upon the threaded lower portion of the tubular extension $a^1$.

The cap $c$ is chambered in such manner as to receive gas issuing from the apertures $a^3$ of the tubular extension $a^1$ and is itself apertured at its upper extremity for discharging gas into the mixing chamber $d$. In the preferred form, the upper extremity of cap $c$ is conically chambered to co-operate with the conical upper extremity of pin $a^2$ in such manner that the raising and lowering of said cap will regulate the amount of gas which may flow from said cap into said mixing chamber.

The lower extremity of cap $c$ is screw threaded to fit into the threaded portion of ring $a^4$, with the result that the rotation of said cap in the proper direction will raise or lower the same and regulate the amount of flow through said cap. Said ring is located near to and is of greater diameter than said nut so that the latter may be protected from accidental contact with exterior objects.

In order that cap $c$ may be conveniently rotated, it is provided with a preferably circular flange $c^1$ which should be knurled or milled upon its edge as shown in Figs. 1 and 7. The parts are so constructed that the lower extremity of cap $c$ may be screwed down on to nut $b$ and be thereby locked in position. As a result of this construction the flow of gas through cap $c$ into the mixing chamber may be regulated by screwing nut $b$ to the proper position upon extension $a^1$, and then screwing cap $c$ down until it jams against said nut. There are at least five advantages in the construction here shown, first, the pin $a^2$ which forms part of the gas valve, remains always stationary; second, the nut $b$ is small in diameter and is completely protected from accidental rotation by contact with exterior objects; third, when the cap $c$ has once been locked against nut $b$ no ordinary accident can disadjust it; fourth, when it has once been determined which position of nut $b$ will permit the flow of the proper amount of gas through cap $c$, said cap may be screwed upward and the top apertures thereof cleaned and the cap subsequently screwed down on to the lock nut without repeating the experiments necessary to bring the cap to proper position; in other words, when the proper position of the lock nut has once been determined the cap may be raised for cleaning or other purposes as frequently as desired but may always be brought back to the exact position to which it had been previously adjusted; and fifth, the joint between cap $c$ and extension $a^1$ is readily made gas-tight by screwing said cap down upon nut $b$. A leak might occur between the sides of said cap and the sides of said extension, for the parts must be loose enough not to bind, but the nut itself has a screw threaded connection with said extension, while the surface of contact between said cap and said nut is great enough and the pressure may readily be made great enough to effectually prevent leakage between the cap and the extension.

It will be noted that the lock nut $b$ forms an adjustable stop and that it is protected from accidental disadjustment by the very piece onto which it screws.

A ring $c^2$ extends upward from the flange $c^1$ and is threaded for the purpose of affording means of attachment for the mixing chamber $d$ above mentioned. Said mixing chamber consists preferably of sheet metal and is of a diameter greater than that of the upper portion of cap $c$. A series of apertures $d^1$ are formed in said mixing chamber $d$ at a height corresponding approximately to the upper extremity of cap $c$. Said apertures serve to admit air for mixture with the gas issuing from cap $c$. By preference the mixing chamber converges slightly at a point adjacent to the outlet of cap $c$; and a tubular extension $d^2$ is formed at the upper extremity of the mixing chamber for fitting into the lower extremity of the burner pipe $e$.

The upper extremity of said burner pipe is of greater diameter than the lower portion thereof with the result that a shoulder $e^1$ is formed at the junction of the upper and lower parts. A filtering gauze $e^2$ should be provided near the upper extremity of pipe $e$ in the usual manner.

The mixing chamber $d$ will, in use, be rigidly secured to cap $c$, by screwing it down tight against the flange $c^1$.

The amount of air which may flow through the apertures $d^1$ into the mixing chamber is governed by means of a shutter $f$ which is also apertured and fits over said mixing chamber at the apertured portion thereof. Said shutter is rotatable, and by rotating it upon said mixing chamber the emission of air into the mixing chamber may be varied or, if desired, be completely shut off. In the preferred form, here shown, said shutter $f$ is rigidly secured to and operated by basket $g$ which also should consist of sheet metal spun in such manner as to rotatably fit over the lower portion of mixing chamber $d$ and rest upon the flange $c^1$ of cap $c$. Said basket is so formed as to flare outwardly commencing at a point below the apertures in the shutter $f$; and said shutter is rigidly secured to said basket so that when said basket is rotated upon the mixing chamber said shutter will also be rotated and the supply of air to the mixing chamber will thereby be regulated. A crown $h$ is mounted upon the upper extremity of basket $g$ and by preference is provided with spring fingers $h^1$ for retaining a chimney in the usual manner. The lower portion of crown $h$ is cylindrical and provided with a row of apertures $h^2$. An annular shutter $i$ which is similarly provided with a series of apertures $i^1$ is adapted to fit over the cylindrical portion of crown $h$ and may be rotated by hand to control the admission of air through the said apertures $h^2$.

A diaphragm $j$ is secured to basket $g$ at a point below apertures $h^2$ and extends inwardly toward the burner pipe $e$. Said diaphragm has a circular opening $j^1$ therein which in the preferred form approaches somewhat closely to the shoulder $e^1$ of the burner pipe. The arrangement is such that when a draft is created by the upward flow of burning gas in pipe $e$, air will be drawn through apertures $h^2$ and $i^1$, up over diaphragm $j$ through the aperture $j^1$ therein, downward along burner pipe $e$ and extension $d^2$ of the mixing chamber, through apertures $d^1$ into the mixing chamber, where it will be mixed with the gas issuing from the opening in cap $c$. As a result of its passage, the air is thoroughly heated by contact with extension $d^2$ before entering the mixing chamber, and consequently the combustion is much quicker and more complete than if the air were admitted cold.

The diaphragm $k$ is located above the apertures $h^2$ in basket $h$, and in the preferred form here shown, circumferentially incloses and makes close contact with pipe $e$ at the annular shoulder $e^3$ formed in said pipe. The outer edge of said diaphragm connects with the crown $h$, the preferred construction being to have the outer rim of said diaphragm fit into an annular shelf $h^3$ rigidly secured to crown $h$ at a point above the apertures $h^2$ therein. Said diaphragm is preferably bell shaped in order to correspond approximately to the shape of the inner diaphragm $j$; and an air passage is thereby formed between said diaphragms which guides the air from apertures $h^2$ to pipe $e$. Said diaphragm $k$ makes a sliding fit with shelf $h^3$ and pipe $e$ so that it may be removed by merely slipping it upward over the top of pipe $e$. When diaphragm $k$ is in position, the flow of air into mixing chamber $d$ may be regulated either by means of shutter $i$ or shutter $f$ but when said diaphragm is removed, regulation is had by means of the shutter $f$ and air may enter the aperture $j^1$ either from the apertures $h^2$ or from the opening previously closed by diaphragm $k$. In the latter case the air comes into contact with a greater portion of the surface of pipe $e$, with the resulting advantage that the air is more completely heated; while in the former case, with diaphragm $k$ present, the burner is less susceptible to drafts of air from the side, and moreover as the flow of air over diaphragm $j$ is quieter, dust particles in the air will be more apt to be precipitated upon diaphragm $j$ and be thereby prevented from reaching the mixing chamber and burner.

Various modifications may be made in the construction of the parts without departing from the spirit of the invention; for example, it is not essential that the ring $a^4$ and tubular extension $a^1$ be integral with nipple $a$, although such construction is preferable.

What I claim as new and desire to secure by Letters Patent is:

1. In a gas burner, a vertically adjustable cap having an aperture therein for the discharge of gas; a tubular stationary member lying partially within said cap adapted to communicate with the source of gas supply, said stationary member discharging into said cap and having a pin for regulating the flow of gas through the aperture in said cap, and said stationary member having an externally threaded portion for engaging a lock nut; an internally threaded ring upon said stationary member of greater diameter than the externally threaded portion thereof and adapted to receive an externally threaded portion of said cap; and a lock nut adapted to screw upon the externally threaded portion of said cap for locking said cap at a predetermined point on said stationary member, said nut being of smaller diameter than the internally threaded portion of said stationary member for the purpose described.

2. In a gas burner, a burner pipe, a mixing chamber below the same; an imperforate basket extending upward from said mixing chamber; and flaring upwardly and outwardly; and a diaphragm extending from the upper portion of the basket to a point near said burner pipe and above said mixing chamber for preventing air from entering said basket except at a point near said burner pipe.

3. In a gas burner, a burner pipe adapted to receive gas and air at its lower extremity; a basket for preventing air from passing directly to the bottom of said burner pipe; a diaphragm closing the top of said basket except at a point near the burner pipe above the bottom thereof; a second diaphragm far enough above the first to leave a passage between them, said upper diaphragm making close contact with said burner pipe, and there being passages at points remote from the burner pipe for admitting air to the chamber formed between said diaphragms.

4. In a gas burner, a burner pipe, adapted to receive gas and air at its lower extremity; a basket for preventing air from passing directly to the bottom of said pipe; a diaphragm closing the top of said basket except at a point near the burner pipe above the bottom thereof; a second diaphragm far enough above the first to leave a passage between them, said upper diaphragm making close contact with said burner pipe; and a shutter for controlling the admission of air to the passage between said diaphragms.

5. In a gas burner, a burner pipe, adapted to receive gas and air at its lower extremity; a basket for preventing air from passing directly to the bottom of said burner pipe; a diaphragm closing the top of said basket except at a point near the burner pipe above the bottom thereof; a second diaphragm far enough above the first to leave a passage between them, said upper diaphragm making close contact with said burner pipe, and said diaphragm being adapted to have air admitted into the passage between them, from a point remote from the burner pipe, and said upper diaphragm being detachable substantially as described.

6. In a gas burner, the combination of a burner pipe adapted to have air and gas introduced at its lower portion, said pipe having its lower portion of reduced diameter whereby an annular shoulder is formed; a basket for preventing air from passing directly to the bottom of said burner pipe; a diaphragm closing the top of the basket except for an opening in said diaphragm adjacent to the shoulder in said burner pipe; a second diaphragm located a short distance above the first whereby an air passage is formed between them; means for regulating the admission of air to said passage; and an annular shoulder upon said burner pipe for detachably supporting said upper diaphragm.

7. In a gas burner, the combination of a stationary member having a tubular extension through which gas is supplied; a cap adapted to inclose said tubular extension and having a portion adapted to controllably stop the aperture in said cap and said cap having an exterior screw thread at its lower extremity; a threaded lock nut screwing upon said tubular extension; and an interiorly threaded ring formed integral with said stationary member and having sufficient diameter to loosely receive said lock nut and engage the lower threaded extremity of said cap, said cap being adapted to be screwed down onto said lock nut for making gas tight connection between the parts.

8. In a gas burner, the combination of a stationary member having a tubular extension through which gas is supplied; a cap adapted to inclose said tubular extension and having an aperture for delivering gas, said tubular extension having a portion adapted to controllably stop the aperture in said cap; and said cap having an exterior screw thread at its lower extremity; a threaded lock nut screwing upon said tubular extension; an interiorly threaded ring formed integral with said stationary member and having sufficient diameter to loosely receive said lock nut and engage the lower threaded extremity of said pipe, said cap being adapted to be screwed down onto said lock nut for making gas tight connection between the parts, and posts integral with said ring and stationary member for supporting said ring and also affording access to said lock nut.

In witness whereof, I have hereunto subscribed my name in the presence of two witnesses.

ELMER E. BILLOW.

Witnesses:
HOWARD M. COX,
CAROLYN RAFTERY.